United States Patent [19]

Shaw

[11] Patent Number: 5,022,780
[45] Date of Patent: Jun. 11, 1991

[54] END CLAMP FOR TEXTILE ROPE WITH A METALLIC CORE

[75] Inventor: Charles R. Shaw, Twinsburg, Ohio
[73] Assignee: Esmet, Inc., Canton, Ohio
[21] Appl. No.: 518,572
[22] Filed: May 3, 1990
[51] Int. Cl.⁵ .............................................. F16G 11/05
[52] U.S. Cl. .................................... 403/275; 29/461; 24/122.6; 24/122.3
[58] Field of Search ............ 403/275; 24/122.6, 122.3; 52/223 L, 230; 29/461

[56] References Cited

U.S. PATENT DOCUMENTS

| | | |
|---|---|---|
| 222,125 | 12/1879 | Brady . |
| 508,587 | 11/1893 | Trumbull . |
| 831,548 | 9/1906 | Fleeger . |
| 1,855,227 | 4/1932 | Fiege . |
| 2,266,357 | 12/1941 | Cooke . |
| 2,533,064 | 12/1950 | Streader . |
| 3,100,924 | 8/1963 | Trier et al. ............................ 403/275 |
| 3,475,795 | 11/1969 | Youngblood ...................... 24/122.6 |
| 3,820,832 | 6/1974 | Brandestini et al. ................... 287/80 |
| 3,952,377 | 4/1976 | Morell .................................... 24/136 |
| 4,509,233 | 4/1985 | Shaw ..................................... 24/136 |
| 4,640,179 | 2/1987 | Cameron ................................... 87/6 |

FOREIGN PATENT DOCUMENTS 2091770 8/1982 United Kingdom ............... 24/122.6

OTHER PUBLICATIONS

Advertising Catalog—Synthetic Rope Fittings—Superior Switchboard & Devices.

Primary Examiner—Andrew V. Kundrat
Attorney, Agent, or Firm—Michael Sand Co.

[57] ABSTRACT

This invention relates to a rope clamp and method of connecting to such clamp an end portion of a composite rope. Such rope has a multi-strand metallic core surrounded by a plurality of inner and outer sheaths of fibrous plastic material, the rope being one which is capable of use by rescue workers, firemen, mountaineers and the like. It is also useful in military and marine applications. The end clamp utilizes a hollow threaded sleeve and first and second tapered wedging plugs for separate connections of the plastic sheaths and metallic core to the rope for permanent and durable end termination.

19 Claims, 5 Drawing Sheets

END CLAMP FOR TEXTILE ROPE WITH A METALLIC CORE

BACKGROUND OF THE INVENTION

1. Technical Field

This invention relates to an improved rope clamp and, more particularly, to a rope clamp for a terminating end of a composite rope having a metallic core and an outer sheath of fibrous plastic material. Such composite rope has a multi-strand metallic core surrounded by one or more outer sheaths of fibrous plastic material comprising a lightweight line capable of carrying heavy loads, which rope is widely used by rescue workers, firemen and in various safety applications. The rope is also frequently used in certain military and marine applications, the rope being resistant to severing, chemicals, shock and the like, and is also resistant to destruction by fire or high temperatures such as may be encountered in fires or explosions.

2. Background Information

Previously, composite ropes fabricated of both metallic and plastic materials into multi-layered flexible lines have been well-known for use in survival-type situations as well as in mountaineering and other hazardous conditions. Their use in such hazardous conditions has been limited by their inherent nature such as in the event of fire or high temperature applications. The nylon or other synthetic materials used in the manufacture of such ropes may melt or burn, or may be so severely weakened that the rope becomes unsafe for further use. Such composite ropes having a metallic core are not easily knotted around stable fixtures and require an improved terminating end clamp to join the rope to a suitable fitting such as a clevis or other threaded member. U.S. Pat. No. 1,855,227 to Fiege discloses a single wedging plug employed in an inner conical recess to clamp a metallic cable to a clevis or turnbuckle. Such clamp is not applicable to use with a composite rope formed of different layered materials, such as one having a metallic core surrounded by plastic sheaths.

Composite ropes which are subjected to applications where they come into contact with rock outcropping or other sharp objects such as in mountaineering or fire fighting, may be severed or partially severed since the synthetic plastic materials utilized in their outer construction are not highly resistant to chafing and severing. Further, if the outer plastic sheath be severed or partially severed, the multi-layer construction allows the individual outer layers to slip along the inner metallic core or relative to one another making the line difficult to grasp or properly handle.

It is also known that exposure to chemicals can also degrade the rope and ultimately cause its failure. Ropes which have been subjected to such exposure are frequently discarded and not used further as a precautionary measure if subjected to any chemicals. This may be true where chemicals are found on the ground where the rope has been lying and been exposed to such chemicals.

A further disadvantage of conventional multi-layer composite rope, particularly when used in rescue and safety applications, is its elasticity. While a conventional rope experiences a certain degree of stretch when under load, undue elasticity of a composite rope may adversely affect various rescue and safety operations. The use of a metal cable core avoids the problem of line loss due to heat, fire and severing problems. Composite ropes or cables, due to their elasticity, are difficult to tie and otherwise manipulate due to their flexible but unwieldy nature. In most cases a knot cannot be safely tied in the cable which will cinch tightly enough to hold and provide safe connection of the line and it is normally difficult to increase the diameter of the cable by doubling it to facilitate grasping of the cable due to weight and other considerations. When a metal cable is employed, its outer surface is frequently too slippery to be securely grasped presenting an unsafe condition and is sometimes too abrasive to be handled safely depending upon the used condition of the cable. Various types of knotting of the cable at its end to various metallic fittings has not been satisfactory since the metallic core and outer sheaths may slide axially with respect to one another resulting in an unsafe condition.

Previously, the fastening of cable ends together or the securing of a single composite cable end to a support has encountered considerable difficulty. Where a strong joint is required at the line end, where the rope is fully fabricated having a metallic core, the line in some cases has been welded to connecting members requiring the use of heating apparatus which is destructive of the sheath of plastic material. Various clamping devices have been utilized but such devices have been found to withstand only very limited strain and do not clamp both the metallic core and the outer plastic sheath by separate clamping elements.

SUMMARY OF THE INVENTION

It is an object of this invention to provide an improved rope clamp for a lightweight, manipulatable readily-grasped composite line of relatively high strength for use by personnel such as firemen, rescue workers, mountaineers and others involved in hazardous, rescue or safety conditions. The clamp is particularly useful with a static composite rope having very little stretch and which will withstand exposure to elevated temperatures, sharp objects, chemicals, sunlight or shock which do not produce failure in the rope or require its premature disposal. The clamp is relatively simple in construction and provides a pair of wedging elements which may be quickly attached to a metallic sleeve and rope end to withstand an unusual amount of strain or loading equal to the actual breaking strength of the rope elements.

It is another object of this invention to provide a composite rope clamp which is capable of securely retaining both the exterior braided or woven layers of plastic material as well as a multi-strand metallic core, both of which are separately restrained in permanently clamped durable relation and which are resistant to axial movement of the sheath along the core and with respect to each other.

A more specific object of this invention is to provide an improved rope clamp for a flexible composite line which employs a pair of complemental wedging plug members which are fitted within the tapered interior of a threaded metallic sleeve capable of being joined to various types of complementally threaded fittings such as a clevis or hook and which is capable of withstanding substantial loads. The outer plastic sheath and the metallic core are separately clamped by the several wedging elements fitted within a tapered opening of a metallic sleeve for separate retention of the outer sheath and central core to prevent relative axial movement of the diverse materials which comprise the composite rope.

The present invention relates to a durable end clamp for a composite line wherein the core is formed of a heat-resistant substantially inelastic metallic cable having at least one or more fibrous plastic sheaths fitted tightly thereabout. The subject clamp is particularly useful in terminating the end of a composite line having an inner fiber sheath braided tightly about the core and an outer fiber sheath braided tightly about the inner sheath. The core has a tensile strength sufficient to separately support the desired rate of loading. The inner and outer sheaths have a combined tensile strength substantially exceeding the tensile strength of the core and contain the core therewithin in such manner that upon breakage of the core under excessive loading, the sheath elements substantially eliminate backlash of the rope. The core has sufficient weight and strength to minimize backlash of the inner and outer sheaths upon subsequent breakage thereof. The composite rope with which the subject clamp is particularly useful is one which will support the rated load even if the inner and outer sheaths are melted or severed by fire, heat or contact with sharp objects, the subject clamp preventing separation of the line at or near its retained end regardless of the adverse conditions encountered.

BRIEF DESCRIPTION OF THE DRAWINGS

A preferred embodiment of the invention, illustrative of the best mode in which the inventor has contemplated applying the principle set forth in the following description, is set forth in the drawings and is particularly and distinctly pointed out and set forth in the appended claims.

Similar numerals refer to similar parts and elements throughout the drawings.

DESCRIPTION OF THE PREFERRED EMBODIMENT

The most commonly used composite rope with which the subject rope clamp may be employed is a rope having an inner sheath of nylon and an outer sheath of polyester. The outer polyester sheath shields the inner nylon sheath from exposure to sunlight and abrasion, against which it is particularly effective, and it thereby protects the nylon from both, such conditions prolonging the life and increasing the durability of the rope. The inner sheath is securely adhered to the wire core by tightly woven braiding adhered to the core to prevent its axial movement therealong. The core is normally comprised of a multi-strand metallic elements such as one comprised of ten to twenty strands of high-tensile strength steel and having a tensile strength of the order of about 7000 PSI. The core may also include high tensile strength polymer fibers. The core may also have an elastic memory which causes the line to assume a coiled configuration whenever tension on the line is eliminated or released.

Figure 1:
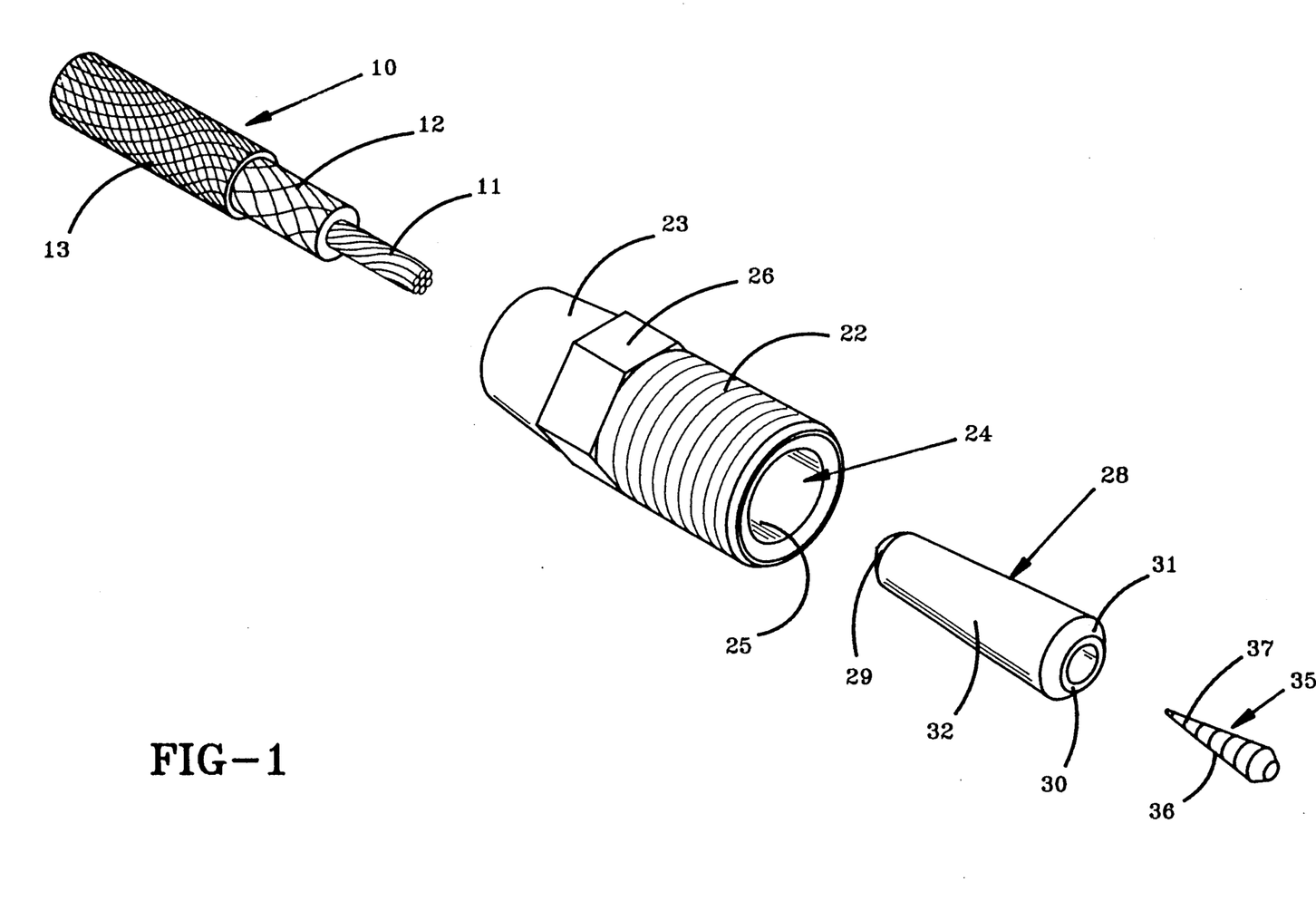
FIG. 1 is an exploded view of the composite rope and various elements which comprise the composite rope clamp.

With reference to FIG. 1 of the drawings, wherein like numerals indicate like parts, the composite rope 10 has greatly improved resistance to destruction by heat or fire, sharp objects, sunlight, chemicals, or shock, the line being particularly applicable to rescue and survival applications where a composite line is especially useful. Rope 10 is fabricated having a central core 11 made of high tensile strength heat and cut-resistant material such as a twisted cable of stainless steel, or other strands formed of metallic elements. The core may be woven or braided from a plurality of metal strands to provide a non-rotating cable as the core and therefore a non-rotating or non-rotatable rope.

Core 11 may be comprised of multi-strand stainless steel elements alone or it may also include an interior core of polyaramid fibers sold under the trademark Kevlar. One example of such cable is manufactured under U.S. Pat. No. 4,034,547 and sold by Loss & Company, Inc. under the trademarks K-KORE and K-FLEX. FIG. 1 shows in an exploded perspective view the composite line with portions thereof cut away for clarity. The core is a multi-strand cable made of a plurality of stainless steel strands surrounding its own core of Kevlar aramid fiber. The exterior of the core may be coated with an adhesive material (not shown) such as rubber cement having good adhesion to the exterior of the cable and to the interior of an inner or primary sheath or sleeve 12 of the line 10.

Primary sheath 12 is comprised of a cylindrical braid of nylon filaments or fibers such as 60 fibers braided to a standard well-known 8-carrier braid construction over the core 11. The core treated with the adhesive material on its exterior is preferably passed upwardly through the center of the 8-carrier braiding apparatus whereupon the inner primary sheath 12 is tightly braided in direct contact with the exterior of the core 11. The adhesive material causes the tightly braided primary sheath to be securely adhered to the outer surface of the core. The first or primary sheath 12 is therefore braided with 4 strands of nylon yarn in each carrier with the braid thereof being formed in a conventional diamond braid.

A secondary sheath 13 is formed in a manner similar to that of the primary sheath 12 but is preferably comprised of polyester fibers. The secondary sheath 13 may be comprised of a cylindrical braid of polyester fibers such as 60 fibers braided to a standard 8-carrier braid construction over the inner primary sheath 12. The composite inner primary sheath 12 and core 11 are passed upwardly through the center of the 8-carrier braiding apparatus whereupon the outer secondary sheath is tightly braided over the outer surface of the primary sheath in a conventional diamond braid. The secondary sheath 13 may be adhered, such as by rubber cement, to the inner primary sheath 12. As is well known in the art, the fibers and braid configurations may be formed of other known plastic fibers and braid configurations to form the primary and secondary sheaths to modify the tensile strength and appearance of the resulting composite line.

By the use of the metallic central core 11 and the inner primary sheath 12 and one or more outer sheaths 13, the rope will not fail if exposed to elevated temperatures encountered in fires or to unusually sharp objects possibly contacted in fire and rescue operations. Should the primary and secondary sheaths 12 and 13 melt, burn or be severed due to elevated temperatures above their softening or melting point temperatures, the metallic core 11 remains intact having sufficient weight-carrying strength to carry the rated load without complete failure of the rope 10.

In a preferred embodiment of the present invention the end clamp is shown in exploded relation in FIG. 1 and designated by the numeral 20. The end clamp is comprised of a metallic sleeve 21 having both threaded and unthreaded exterior surfaces 22 and 23 respectively. A tapered central opening 24 is provided within the sleeve, its smaller end being slightly larger than the outer diameter of the composite line. The tapered opening within the sleeve is essentially uniformly tapered to a larger opening 25 at the extremity of the threaded portion. An intermediate central hexagonal portion 26 is provided at a medial region of the sleeve to facilitate its firm retention such as by a vise or wrench.

A first metallic hollow wedging plug member 28 having both interiorly and exteriorly tapered conical surfaces is provided, comparable in strength to the sleeve which is constructed of metal. As shown in FIG. 1, the first wedging plug 28 has a curved smaller end 29 and an essentially flat surface portion 30 at is larger end 31. The curved or bullet-shaped smaller end of the sleeve facilitates its being driven into the sleeve 21 in centered relation. The flattened surface 30 at the larger end 31 of the first wedging plug facilitates its being driven by a wedging or driving tube into the sleeve 21. The outer tapered surface 32 of the first plug has a taper which is a gently sloping configuration comparable to that of the tapered opening 24 of the sleeve.

A second wedging plug member 35 is provided having a double-conical shape and a sharper tapered configuration over its outer surface 36 than the tapered opening of the first wedging plug 28 as shown in FIG. 1. The larger conical surface 36 has a series of cylindrical serrations 37 over such surface and a shorter conical surface over its larger end to facilitate its being driven into the first wedging plug. The design of the second wedging plug 35 may vary with the size and construction of the wire rope core 11. The second wedging plug as described is for a wire core that itself has a synthetic core or a so-called "fiber core". For small diameter wire ropes which themselves also have a wire core, a different configuration of second wedging plug member may be used. This wedging member has a drilled hole axially through the center to pass its wire core and a slit through the side and down to the core to permit the plug to collapse down onto the wire core. If the wire core is sufficiently large, then a two-piece split wedge is used.

Figure 2:
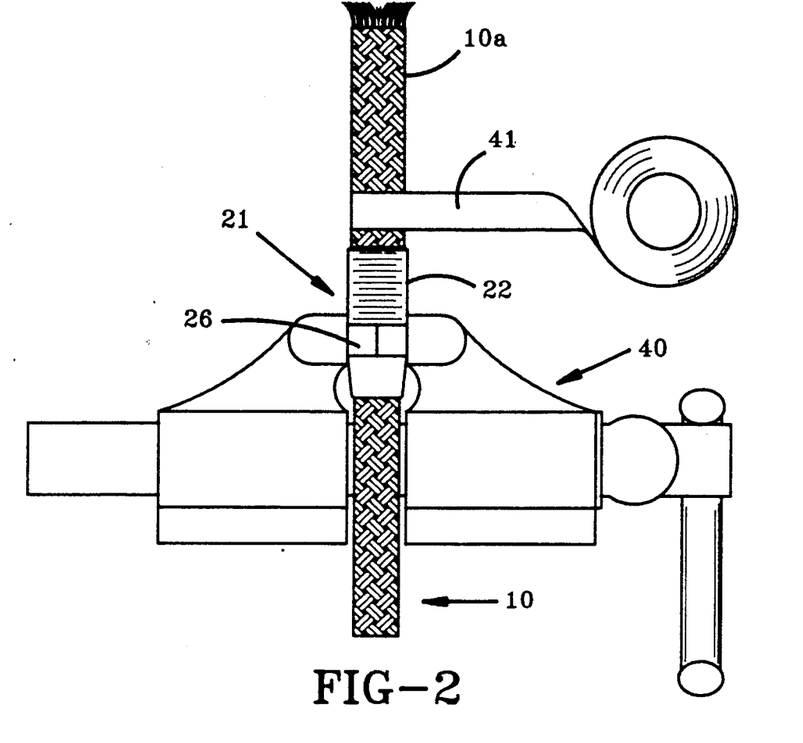
FIG. 2 is a side elevational view of the composite rope and tubular sleeve telescoped together in initial connecting relation.

The subject end clamp of the present invention and its durable and permanent attachment to the composite rope are described hereinafter. As shown in FIG. 2, the composite rope 10 is inserted into the non-threaded end of the sleeve 21 a prescribed distance with its end 10a projecting a substantial distance upwardly therebeyond. The sleeve is firmly mounted vertically within a vise 40, the vise jaws clamping opposing sides of the hexagonal-shaped intermediate portion 26 of the sleeve. A short length of adhesive tape 41 is wrapped around the composite line 10 above the sleeve so that a length of line extends beyond the sleeve extremity a prescribed distance. Depending upon the particular size of the composite rope, such dimension is measured from the adhered tape to insure that a sufficient length of the composite line is available for subsequent clamping action. The prescribed length dimension is longer for greater sizes of composite rope to insure positive clamping of the sheath and core elements when unbraided.

Figure 3:
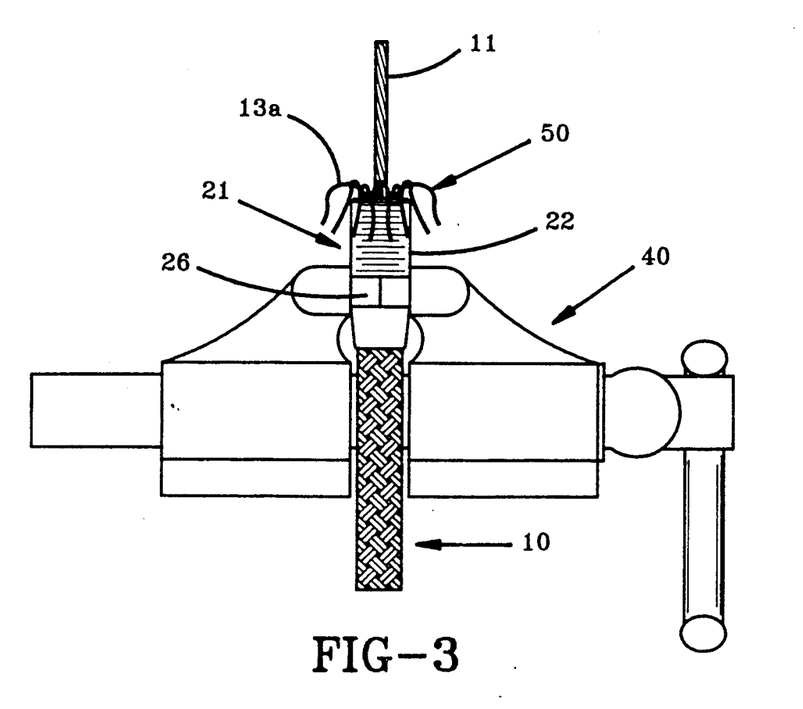
FIG. 3 is a view similar to FIG. 2 of the inner and outer sheaths of fibrous plastic material frayed over the terminating end of the sleeve with the central core exposed.

As shown in FIG. 3 the outer braided sheath 13 of the line is unbraided or unlaid and initially laid radially over the terminating end of the sleeve adjacent the threaded portion. The outer braids 13a are radially distributed in a uniform manner over the sleeve extremity in such manner that they are aligned circumferentially in centrally and radially uniform distribution over the sleeve. The inner braided sheath 12 is then unbraided and unlaid over the braids which comprise the first sheath in a similar manner such that they are equally radially distributed over the sleeve. Thus, the frayed braids of the twin sheaths are intermixed with particular care being given to uniform radial distribution of the braids over the sleeve.

Figure 4:
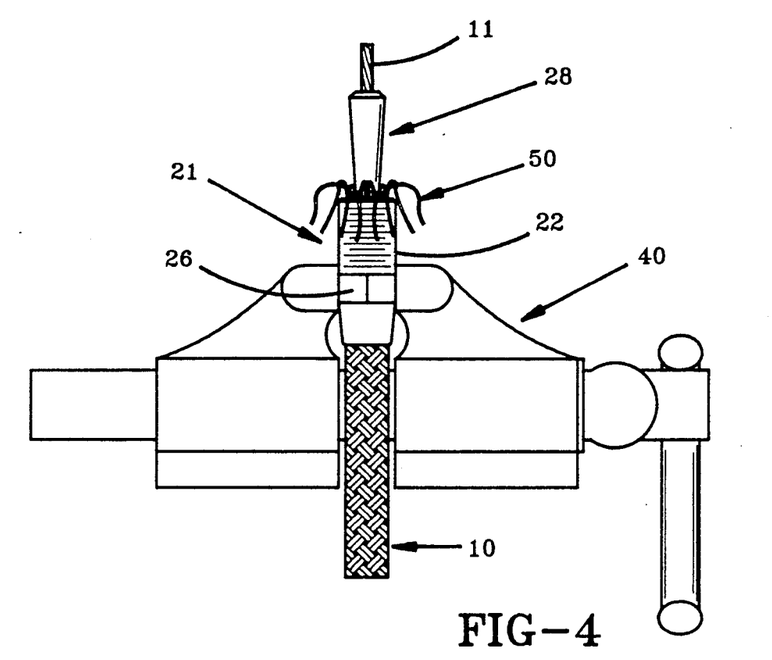
FIG. 4 is a view similar to FIG. 3 with a first wedging plug member centered in the tubular sleeve ready to wedge the frayed sheath elements to the sleeve.
Figure 5:
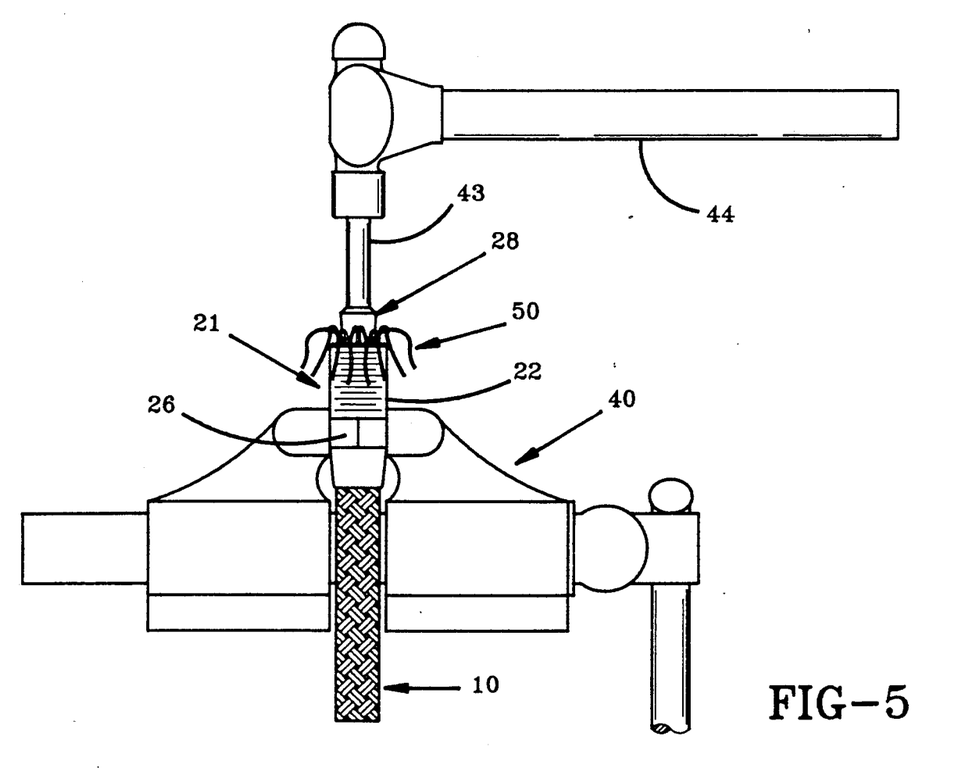
FIG. 5 is a view similar to FIG. 4 with a driving tube and hammer adapted to drive the first wedging plug into the sleeve wedging the frayed sheath elements to the sleeve.

As shown in FIG. 4, the first wedging plug member 28 which has the tapered opening 24 is mounted over the wire core 11 and into the center of the frayed fibers designated by the numeral 50 (FIGS. 3 and 4). After initial contact is made between the first plug and the distributed braids, the line is pulled relatively tightly downwardly with the plug partially inserted into the sleeve. It is desirable that all the fibrous braids be uniformly distributed around the plug prior to its being driven into seated relation within the sleeve as shown in FIGS. 4 and 5 in order to achieve the best possible clamping of the distributed braids between the first plug and the sleeve opening. The first plug and sleeve opening each have tapered configurations which are generally comparable so that relatively large surface areas of the braids are grasped between the plug and sleeve surfaces when the plug is moved with respect to the sleeve.

Figure 6:
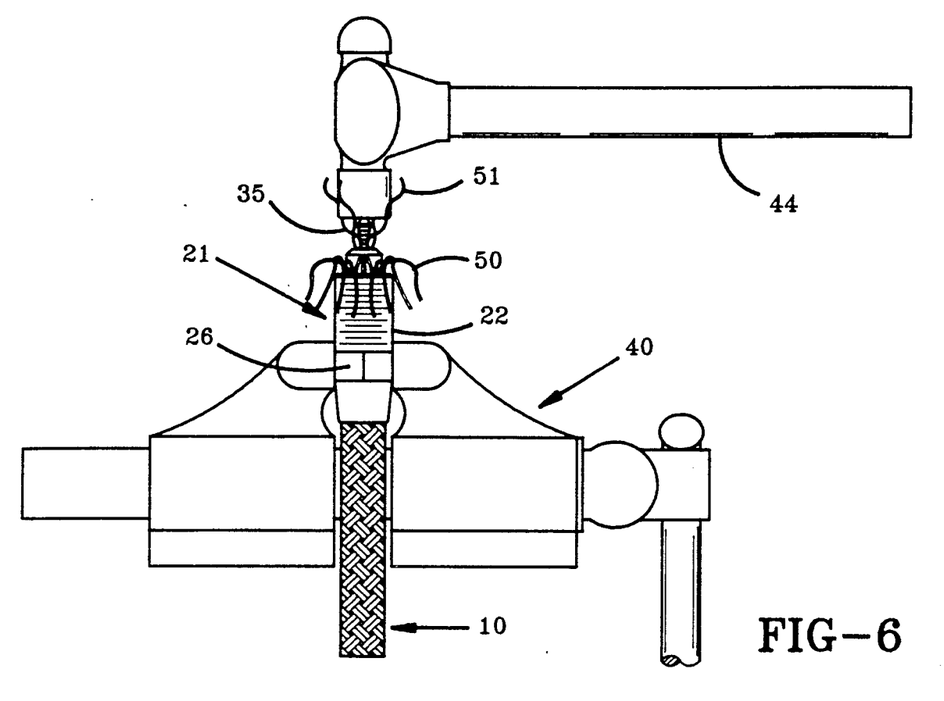
FIG. 6 is a view similar to FIG. 5 with the central core elements frayed and ready to be clamped between the first and second wedging plug members.

With the central core projecting exteriorly beyond the first plug, a driving tube 43 and hammer 44 are (FIG. 5) respectively used to drive or tap the plug 21 into solid seating arrangement. The driving tube 43 is fitted over and around the central core to permit the forceful driving action to clamp essentially all of the fibers of the twin sheaths into positively locked arrangement. After the plug is fully seated within the sleeve, the 6 to 10 outer strands of the wire core 11 are unlaid in a frayed uniformly-distributed pattern over the exposed braids of the inner and outer sheaths. The second wedging plug member 35 is fitted centrally within the center of the unlaid or frayed plural strands 51 of the wire core 11 as shown in FIG. 6. The second wedging plug member has cylindrical serrations 36 on its larger conical surface and is comprised of a softer material than the first plug. A double-conical configuration of the second plug, preferably formed of brass, is then centrally mounted within the unbraided metal strands. The hammer 44 is then used to drive the second wedging plug 35 into the upper opening of the first wedging plug until a solid seat is obtained with the metallic wire clamped between the first and second wedging plug members. A solid plug driver (not shown) may be employed to tap the inner or second plug into a solid seat within the first plug.

Figure 7:
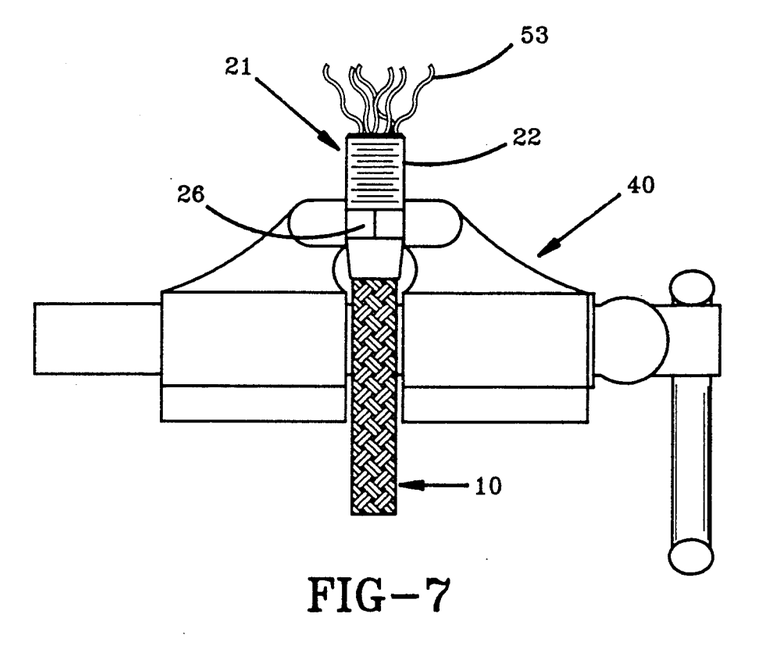
FIG. 7 is a view similar to FIG. 6 with the projecting frayed sheath and central core elements connected to the sleeve with their projecting ends ready to be joined together.
Figure 8:
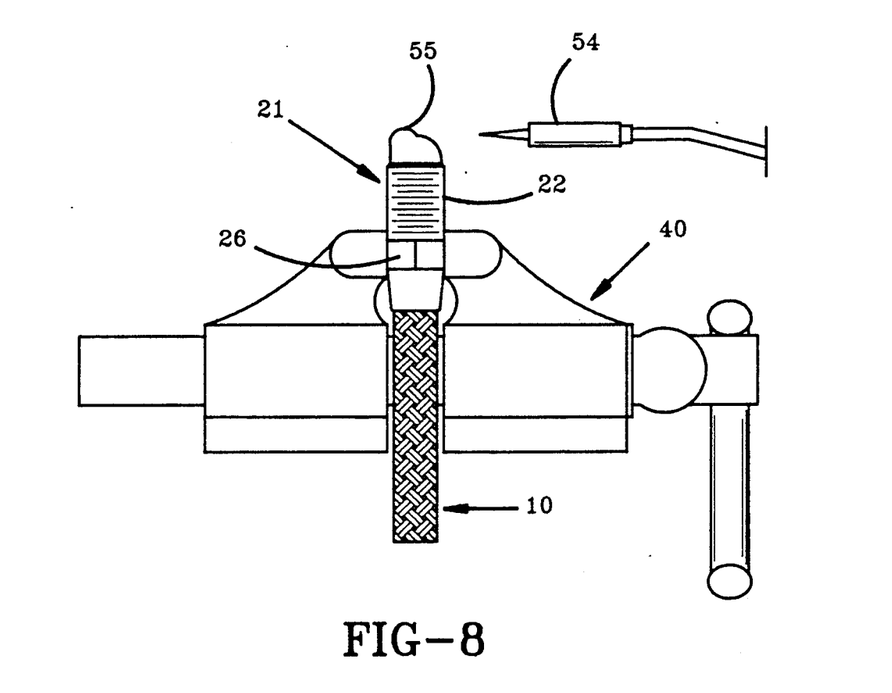
FIG. 8 is a view similar to FIG. 7 wherein the frayed elements are grouped together and the sheath elements thermally fused by heating.

After the wire strands are fully seated between the two wedging plugs and formed into a solid seat, the excess lengths of the wire strands are severed closely adjacent the exterior of the second plug. The exteriorly-extending frayed fibers of the several sheaths are then gathered together and uniformly distributed around the pair of wedging plugs. A length of adhesive tape is employed to tightly seize all of the fibers above the body of the projecting plugs. After the fibers are grouped together and joined by the adhesive tape, the excess lengths of fibers are severed a short distance above the tape. With the fibers held together by the tape, a torch or heating gun 54 is employed to fuse the protruding fibrous plastic elements 55 together just above the tape. Care must be employed not to melt the fibers below the top of the first plug after the upwardly-projecting fibers are initially joined by fusion. Care must be exercised not to melt any of the fibers retained between the sleeve and first wedging plug. The fused diameter of the melted fibers mass must be carefully controlled so that the mass diameter is less than the inside diameter of the sleeve to facilitate the attachment of a suitable connecting fitting to the sleeve.

Figure 9:
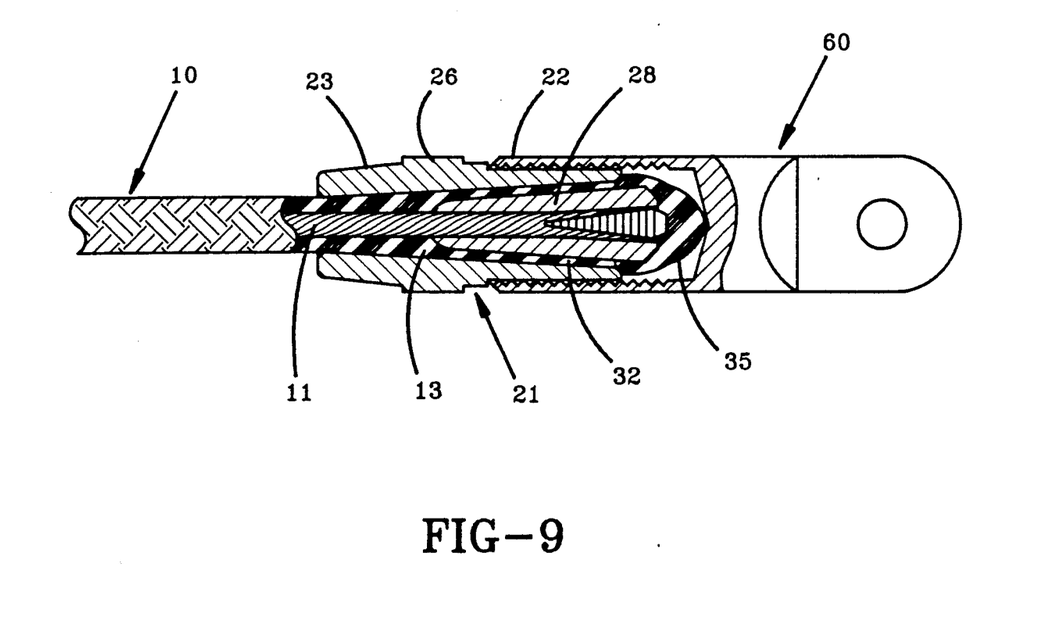
FIG. 9 is a vertical sectional view of the rope clamp in fully assembled relation joined to the composite rope with an eye member joined to the sleeve.

As shown in FIG. 9, a threaded socket adapter 60 such as a clevis, eye, oval eye or the like may be screwed onto the threaded portion of the sleeve to make a durable connection between the line with sleeve attached and another similar or dissimilar rope depending upon the desired applications. The end clamp constructed in accordance with this invention exhibits great strength in tension comparable to the composite rope itself. The individual clamping of the different line materials serves to prevent any relative axial movement between the twin sheaths and the central core. In the event that any loosening of the diverse materials does occur, the remaining clamped portions prevent any sudden release of the clamp from the rope end. With the double clamping action each formed into a separate solid seat, the twin seats are not fully dependent one upon the other, and each seat is capable of carrying the rated load of the line. The softer metal of the second plug insures a positive solid seating of the wire core strands which alone can carry the load.

In the forgoing description, certain terms have been used for brevity, clearness and understanding; but no unnecessary limitations are to be implied therefrom beyond the requirements of the prior art, because such terms are used for descriptive purposes and are intended to be broadly construed.

Having now described the features, discoveries and principles of the invention, the manner in which the improved end clamp for a composite rope is constructed and used in several forms, the characteristics of the construction, and the advantageous, new and useful results obtained; the new and useful structures, devices, elements, arrangements, parts and combinations, are set forth in the appended claims.

I claim:

1. A rope clamp for connecting the end of a composite rope having a heat-resistant multi-strand metallic cable core, a first inner fibrous plastic sheath wrapped tightly around said core, and a second outer fibrous plastic sheath wrapped tightly around said inner sheath, said rope clamp comprising a hollow sleeve member having an outer male threaded portion and a tapered central opening adapted to receive the said composite rope with its terminating end extending beyond the larger end of said sleeve tapered opening, the inner and outer sheaths being frayed outwardly adjacent the larger end of the tapered opening of said sleeve, a first hollow wedging plug member having a tapered central opening and smooth tapered exterior surfaces generally complemental in contour to said sleeve tapered opening, said first wedging plug member and said sleeve member being movable with respect to one another to clamp the frayed inner and outer sheaths between said first wedging plug member and the tapered central opening of said sleeve, the multi-strand metallic cable core being frayed over the outer extremity of said first wedging plug member, a second wedging plug member having a sharper taper than said first wedging plug member, said first and second wedging plug members being movable with respect to one another to clamp the frayed multi-strand metallic core between said first and second wedging plug members, the plural strands of said frayed inner and outer sheaths and said multi-strand central core extending exteriorly from the respective first and second wedging plug members being gathered together joinedly beyond said sleeve by melting for positive durable interconnection of said rope to said sleeve.

2. The rope clamp in accordance with claim 1, wherein the said first wedging plug member is precisely centered within said tapered sleeve opening to wedge the frayed inner and outer sheath elements in positively clamped relation.

3. The rope clamp in accordance with claim 1, wherein the said second wedging plug member is solid and has circumferentially-serrated surfaces to clamp the frayed strands of said metallic central core to said first wedging plug member in positively clamped relation.

4. The line clamp in accordance with claim 1, wherein the said second wedging plug member is comprised of softer material than said metallic central core to ensure positive clamping of the frayed multi-strands of said metallic central core between said first and second wedging plug members.

5. The line clamp in accordance with claim 1, wherein the said sleeve and said first wedging plug member are comprised of any metal and said second wedging plug member is comprised of brass.

6. The line clamp in accordance with claim 1, wherein the said second wedging plug member is comprised of brass and has a double-conical configuration with circumferential grooves on its larger conical surfaces adapted to positively engage the frayed strands of said metallic central core between said first and second wedging plug members.

7. The rope clamp in accordance with claim 9, wherein the said frayed inner and outer plastic sheath strands are thermally fused into an integral mass having a diameter less than the inner diameter of said sleeve.

8. The method of connecting a rope clamp to the end of a composite rope having a heat-resistant multi-strand metallic cable core, a first inner fibrous plastic sheath wrapped tightly around said core and a second outer fibrous plastic sheath wrapped tightly around said inner sheath, said method comprising the steps of;
   a) passing the rope through a hollow sleeve having a tapered central opening and threaded and non-threaded exterior surface portions, the rope having its terminating end extending beyond the threaded portion of said sleeve and the larger end of said tapered central opening,
   b) fraying the inner and outer sheaths over the extremity of said sleeve threaded portion while leaving the metallic cable core intact,
   c) forcefully introducing a first wedging plug member having a conical exterior configuration and a tapered central opening into the larger end of said sleeve tapered opening to clamp the frayed inner and outer sheaths between said first wedging plug member and said sleeve,
   d) fraying the central metallic cable core over the extremity of the first wedging plug member,
   e) forcefully introducing a smaller second wedging plug member into the tapered central opening in said first wedging plug member to clamp the frayed multi-strand metallic cable core between said first and second wedging plug members,
   f) collecting and adhesively joining the frayed inner and outer sheaths and the frayed cable core elements into a tightly-restrained re-assembled grouping beyond said first and second wedging plug members, and
   g) severing the joined grouping of sheath and cable core elements transversely beyond their adhesive joinder adjacent the extremity of the sleeve threaded portion.

9. The method in accordance with claim 8, including the step of forcefully locking said frayed sheath elements and said frayed metallic cable core elements to said sleeve by successively applying axial mechanical force to said first and second wedging plug members to obtain positive and durable clamping of the frayed elements to said sleeve.

10. The method in accordance with claim 8, including the step of interlocking said frayed metallic cable core between said first wedging plug member and said second wedging plug member, the latter comprised of a softer material than said first wedging plug member, the second wedging plug member having serrated conical surfaces to interlock the frayed metallic core elements with the tapered central opening of said first wedging plug member.

11. The method in accordance with claim 8, including the step of precisely centering the frayed elements of said inner and outer plastic sheaths around the larger end of the tapered sleeve opening prior to forcefully introducing the first wedging plug member into said sleeve.

12. The method in accordance with claim 8, including the step of precisely centering the first wedging plug member within the said frayed elements of said inner and outer sheaths prior to forcefully introducing said first wedging plug member into said sleeve.

13. The method in accordance with claim 8, including the step of precisely centering the frayed metallic core elements around the tapered central opening of said first wedging plug member prior to forcefully introducing the second wedging plug member into said first wedging plug member.

14. The method in accordance with claim 8, including the step of employing a separate tubular driving member and hammer to forcefully introduce said first and second wedging plug members successively into said sleeve.

15. The method in accordance with claim 8, including the steps of collecting and thermally joining the frayed exteriorly projecting sheaths to prevent the sheaths from loosening and slipping past the first wedging plug.

16. The method in accordance with claim 8, including the step of driving the second wedging plug member into the first wedging plug member to form a solid seat to obtain durable permanent joinder of said members.

17. The method in accordance with claim 8, including the step of heating the protruding fibrous plastic elements of said inner and outer sheaths to thermally fuse the same into an integral mass exteriorly of said sleeve and wedging plug members.

18. The method in accordance with claim 17, including the step of thermally fusing the fibrous sheath elements into a fused mass having a diameter less than the inner diameter of said sleeve, the threaded portion of said sleeve being adapted to receive a complementally-threaded female fitting.

19. The method in accordance with claim 8, including the step of connecting the threaded portion of said sleeve to a complementally-threaded portion of a separate fitting member.

* * * * *